(12) United States Patent
Sakumoto

(10) Patent No.: US 12,014,245 B2
(45) Date of Patent: Jun. 18, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventor: Koichi Sakumoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/919,421

(22) PCT Filed: Feb. 5, 2021

(86) PCT No.: PCT/JP2021/004196
§ 371 (c)(1),
(2) Date: Oct. 17, 2022

(87) PCT Pub. No.: WO2021/245982
PCT Pub. Date: Dec. 9, 2021

(65) Prior Publication Data
US 2023/0161988 A1     May 25, 2023

(30) Foreign Application Priority Data
Jun. 2, 2020    (JP) .................................. 2020-095980

(51) Int. Cl.
*G06K 7/14*    (2006.01)
(52) U.S. Cl.
CPC .................................. *G06K 7/1417* (2013.01)

(58) Field of Classification Search
CPC .. G06K 7/1417; G06K 7/1439; G06K 7/1473; G06K 19/06037; G06K 19/06093
See application file for complete search history.

(56) References Cited

U.S. PATENT DOCUMENTS

| | | | |
|---|---|---|---|
| 2007/0023523 A1* | 2/2007 | Onishi | G06F 3/0321 235/494 |
| 2007/0181691 A1* | 8/2007 | Chang | G06F 16/9554 235/462.41 |
| 2008/0049134 A1* | 2/2008 | Saito | G03B 29/00 348/E5.045 |

(Continued)

FOREIGN PATENT DOCUMENTS

| | | | |
|---|---|---|---|
| CN | 112950540 A * | 6/2021 | ............ G06T 5/002 |
| JP | H1139420 A * | 2/1999 | ............... G06K 7/00 |

(Continued)

OTHER PUBLICATIONS

JPH1139420A Code Reader, 4 pages. (Year: 2023).*
CN 112950540B—A method and device recognition bar code, 12 pages. (Year: 2023).*

*Primary Examiner* — Tuyen K Vo
(74) *Attorney, Agent, or Firm* — Paratus Law Group, PLLC

(57) ABSTRACT

There is provided an information processing device to realize more efficient reading of a target code. The information processing device includes an acquisition unit that acquires a target code from a captured image to acquire information from the target code. The acquisition unit acquires a target code from a captured image of a tile code in which a plurality of identical target codes are arranged at predetermined intervals.

19 Claims, 10 Drawing Sheets

(56) References Cited

U.S. PATENT DOCUMENTS

| | | | |
|---|---|---|---|
| 2008/0149714 A1 | 6/2008 | Cheung | |
| 2009/0159658 A1* | 6/2009 | Cheung | G06K 7/10722 |
| | | | 235/375 |
| 2016/0080652 A1* | 3/2016 | Shirota | G06K 7/1404 |
| | | | 348/222.1 |
| 2017/0132445 A1* | 5/2017 | Sugaya | G06K 7/1413 |
| 2017/0273175 A1* | 9/2017 | Obinata | H05K 1/113 |

FOREIGN PATENT DOCUMENTS

| | | |
|---|---|---|
| JP | 2007-041691 A | 2/2007 |
| JP | 2011-239292 A | 11/2011 |
| JP | 2013-206348 A | 10/2013 |
| JP | 2017-091050 A | 5/2017 |

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2021/004196 (filed on Feb. 5, 2021) under 35 U.S.C. § 371, which claims priority to Japanese Patent Application No. 2020-095980 (filed on Jun. 2, 2020), which are all hereby incorporated by reference in their entirety.

TECHNICAL FIELD

The present disclosure relates to an information processing device, an information processing method, and a program.

BACKGROUND ART

In recent years, technologies for recording and reading various types of information through a code such as a two-dimensional code have been developed. Many proposals have also been made for efficiently reading various types of codes. For example, PTL 1 discloses a technology for performing correction suitable for data of a captured image of a distant object and data of a captured image of a near object by changing their correction coefficient.

CITATION LIST

Patent Literature

PTL 1

JP 2011-239292 A

SUMMARY

Technical Problem

Efficient reading of various types of codes not only improves the speed of acquiring information, but also leads to reducing the load required for re-reading and the like as well as improving usability.

Solution to Problem

According to one aspect of the present disclosure, an information processing device is provided, including an acquisition unit that acquires a target code from a captured image to acquire information from the target code, wherein the acquisition unit acquires a target code from a captured image of a tile code in which a plurality of identical target codes are arranged at predetermined intervals.

According to another aspect of the present disclosure, an information processing method is provided, including acquiring, by a processor, a target code from a captured image to acquire information from the target code, wherein the acquiring further includes acquiring a target code from a captured image of a tile code in which a plurality of identical target codes are arranged at predetermined intervals.

According to still another aspect of the present disclosure, a program is provided, causing a computer to function as an information processing device including an acquisition unit that acquires a target code from a captured image to acquire information from the target code, wherein the acquisition unit acquires a target code from a captured image of a tile code in which a plurality of identical target codes are arranged at predetermined intervals.

DESCRIPTION OF EMBODIMENTS

Figure 1:
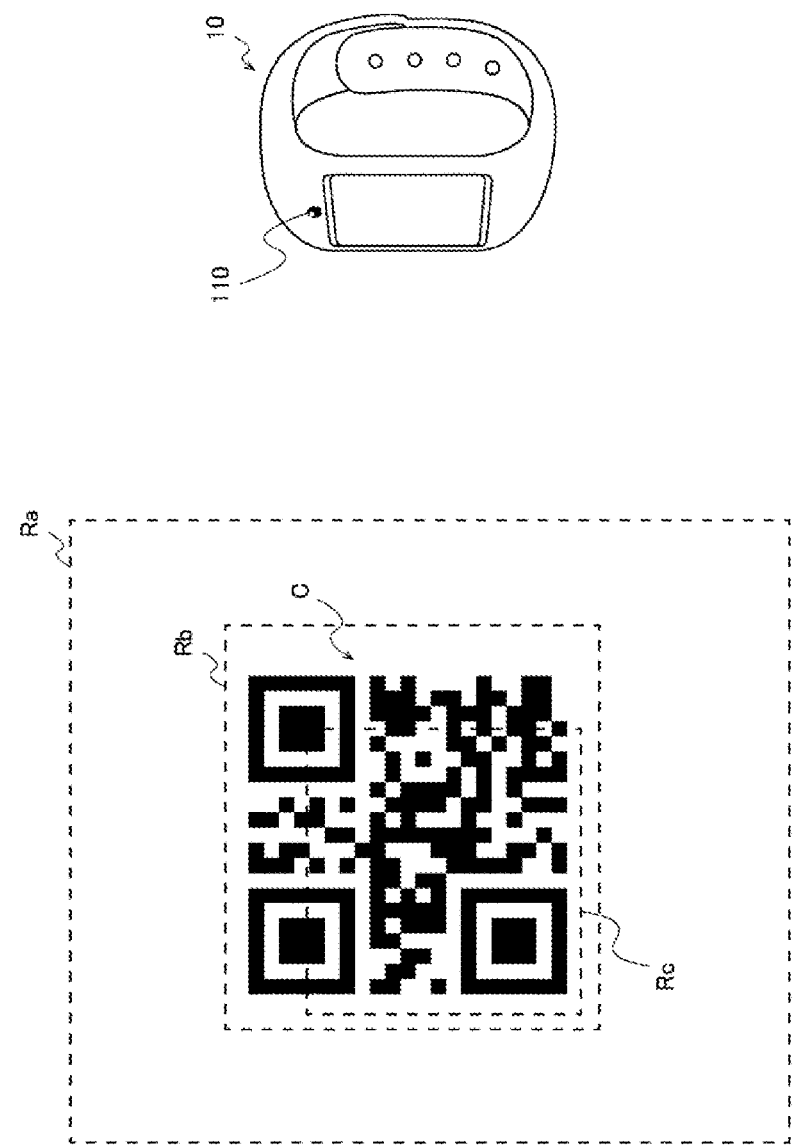
FIG. 1 is a diagram illustrating a relationship between an information processing device 10 according to an embodiment of the present disclosure, an imaging range of the information processing device 10, and a target code.

Preferred embodiments of the present disclosure will be described in detail with reference to the accompanying figures below. Also, in the present specification and the figures, components having substantially the same functional configuration will be denoted by the same reference numerals, and thus repeated descriptions thereof will be omitted.

The description will be given in the following order.
1. Embodiment
1.1. Background
1.2. Functional configuration example of information processing device 10
1.3. Details
1.4. Flow of processing
1.5. Application examples
2. Hardware configuration example
3. Conclusion

1. Embodiment

1.1. Background

First, the background of the present disclosure will be described. As described above, in recent years, technologies for recording and reading various types of information through a code such as a two-dimensional code have become widespread. These allow users to acquire various types of information by various types of devices reading a code to be read (hereinafter referred to as a target code).

On the other hand, in order to read the target code by a general device, the user is required to adjust the imaging position and the like. For example, when the target code is read by a smartphone, the user is required to adjust the imaging position or the like so that the entire target code fits within the imaging range of the smartphone.

In addition, in the case where the smartphone does not have an autofocus function, the user needs to further adjust the imaging position and the like so as to focus on the target code.

Such adjustments made by the user are generally performed by the user while visually observing the image to be captured.

However, depending on the device that reads the target code, it may be difficult to make the adjustments with visual observation.

FIG. 1 is a diagram illustrating a relationship between an information processing device 10 according to an embodiment of the present disclosure, an imaging range of the information processing device 10, and a target code. As illustrated, the target code according to the present embodiment may include, for example, a two-dimensional code such as a QR code (registered trademark). In the following, an example in which the target code according to the present embodiment is a two-dimensional code will be described.

On the right side of FIG. 1, an example is illustrated in which the information processing device 10 according to the present embodiment is a watch-type wearable device. The information processing device 10 does, for example, based on a user operation, macro photography of a two-dimensional code C by an imaging unit 110 positioned on the back side of the user's hand. Here, it is assumed that the imaging unit 110 does not have an autofocus function.

In the following, a case will be described in which the image captured by the imaging unit 110 is not presented to the user. Specifically, unlike the reading of the two-dimensional code C by a general smartphone or the like, the situation in which the user cannot adjust the imaging position while visually observing the image to be captured will be described.

On the left side of FIG. 1, the two-dimensional code C and imaging ranges Ra to Rc of the imaging unit 110 included in the information processing device 10 are exemplified.

The imaging range Ra is an example that allows for imaging in a range sufficiently larger than the size of the two-dimensional code C. For example, the imaging range Ra may satisfy the conditions of S<<W and S<<H where S is the length of one side of the two-dimensional code C, W is the width of the imaging range Ra, and H is the height of the imaging range Ra.

In that conditions, even if the image captured by the imaging unit 110 is not presented to the user, the entire two-dimensional code C is likely to be captured.

In contrast, the imaging range Rb is an example that allows for imaging in a range slightly larger than the size of the two-dimensional code C. For example, the imaging range Rb may satisfy the conditions of S≤W and S≤H where S is the length of one side of the two-dimensional code C, W is the width of the imaging range Rb, and H is the height of the imaging range Rb.

In that conditions, the position where the entire two-dimensional code C can be captured is extremely limited as compared with the imaging range Ra. Accordingly, if the image captured by the imaging unit 110 is not presented to the user, it is expected that the time required for adjusting the imaging position will increase and the load on the user will also increase.

On the other hand, the imaging range Rc is an example in which the imaging range is smaller than the size of the two-dimensional code C. For example, the imaging range Rc may satisfy the conditions of S>W and S>H where S is the length of one side of the two-dimensional code C, W is the width of the imaging range Rc, and H is the height of the imaging range Rc.

In that conditions, even if the image captured by the imaging unit 110 is presented to the user, the imaging unit 110 cannot capture the entire two-dimensional code C, so that the information recorded in the two-dimensional code C cannot be read by a common method.

As described above, the load on the user due to reading the two-dimensional code C is greatly affected by whether or not the image to be captured is presented and by the characteristics of the imaging functions including the imaging range and the autofocus function.

A technical idea according to the embodiment of the present disclosure is conceived by paying attention to the above points, and realizes more efficient reading of the target code.

To this end, the information processing device 10 according to the embodiment of the present disclosure includes an acquisition unit 120 that acquires a target code from a captured image to acquire information from the acquired target code. The acquisition unit 120 according to the embodiment of the present disclosure has a feature of acquiring a two-dimensional code from a captured image of a tile code in which a plurality of identical target codes are arranged at predetermined intervals.

Figure 2:
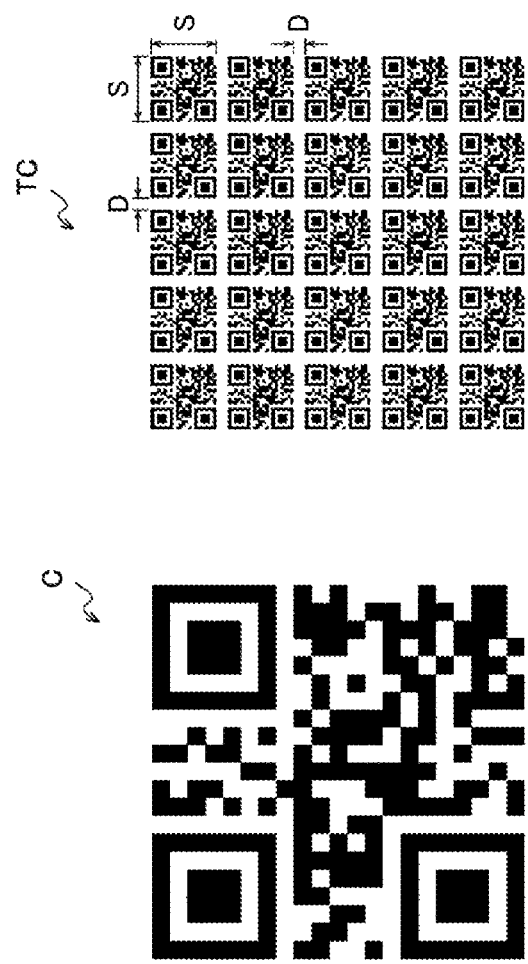
FIG. 2 is a diagram illustrating an example of a tile code according to the embodiment.

That tile code will now be described in detail. FIG. 2 is a diagram illustrating an example of the tile code according to the present embodiment.

An example of the typical two-dimensional code C is illustrated on the left side of FIG. 2, and an example of a tile code TC according to the present embodiment is illustrated on the right side of FIG. 2. The size of the two-dimensional code C illustrated in FIG. 2 and the size of the tile code TC may be substantially the same.

The tile code according to the present embodiment may be a code in which at least two or more two-dimensional codes with the same shape and same size are arranged at predetermined intervals in each of a first direction (for example, the X axis) and a second direction (for example, the Y axis) orthogonal to the first direction.

For example, in the tile code TC illustrated in FIG. 2, five two-dimensional codes are arranged on each of the X-axis and the Y-axis, in which each two-dimensional code is reduced at a predetermined reduction ratio (with one side having a length S) so that the tile code TC has the same shape and same size as the two-dimensional code C on the left of the drawing. Intervals D between the two-dimensional codes in the tile code TC may have the same length.

In other words, in the tile code TC according to the present embodiment, a plurality of two-dimensional codes which are exactly the same in shape and size are aligned and arranged at predetermined intervals.

As described above, the overall size of the tile code TC according to the present embodiment may be substantially the same as the size of the typical two-dimensional code C.

According to the tile code TC as described above, even if the imaging range of the imaging unit 110 is small, it is possible to greatly increase the possibility that any one of the plurality of two-dimensional codes included therein is captured, thereby improving the reading performance of the two-dimensional code.

Further, according to the tile code TC as described above, even if the image captured by the imaging unit 110 is not presented to the user, any one of the two-dimensional codes is likely to be captured without the user being particularly aware of it. Therefore, the tile code TC according to the present embodiment makes it possible to greatly reduce the adjustment load on the user.

Hereinafter, a configuration example for reading the tile code TC according to the present embodiment will be described in detail.

<<1.2. Functional Configuration Example of Information Processing Device 10>>

Figure 3:
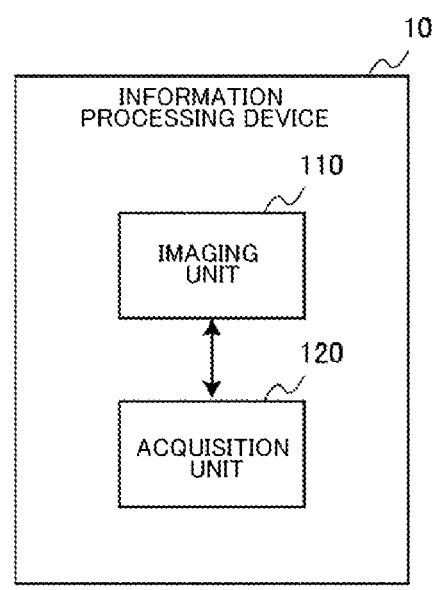
FIG. 3 is a block diagram illustrating a configuration example of the information processing device 10 according to the embodiment.

FIG. 3 is a block diagram illustrating a configuration example of the information processing device 10 according to the present embodiment. As illustrated in FIG. 3, the information processing device 10 according to the present embodiment may include the imaging unit 110 and the acquisition unit 120.

(Imaging Unit 110)

The imaging unit 110 according to the present embodiment captures an image. In particular, the imaging unit 110 according to the present embodiment captures an image of the tile code as being a subject. Accordingly, the imaging unit 110 according to the present embodiment includes various imaging mechanisms depending on the characteristics of the information processing device 10.

For example, as described above, the information processing device 10 according to the present embodiment may be a watch-type wearable device. In this case, the imaging unit 110 according to the present embodiment may do macro photography of the tile code by using an MLA sensor, a pinhole camera, or the like. The imaging unit 110 according to the present embodiment may continuously do macro photography of the tile code based on a user operation such as holding the information processing device 10 over a plane.

On the other hand, the imaging method of the imaging unit 110 according to the present embodiment is not necessarily limited to the macro photography as described above as long as the imaging unit 110 has a function of capturing an image of the tile code.

(Acquisition Unit 120)

The acquisition unit 120 according to the present embodiment acquires a two-dimensional code from the image captured by the imaging unit 110 to acquire information from the two-dimensional code. Specifically, the acquisition unit 120 according to the present embodiment has a feature of acquiring a two-dimensional code from a captured image of the tile code in which the identical two-dimensional codes are arranged at predetermined intervals.

The functions of the acquisition unit 120 according to the present embodiment are implemented by various types of processors. The details of the functions of the acquisition unit 120 according to the present embodiment will be described separately.

The functional configuration example of the information processing device 10 according to the present embodiment has been described above. Note that the above-mentioned functional configuration described with reference to FIG. 3 is merely an example, and the functional configuration of the information processing device 10 according to the present embodiment is not limited to such an example.

The information processing device 10 according to the present embodiment may further include a creation unit that creates, for example, based on an input target code, a tile code in which a plurality of target codes with the same shape as the input target code are arranged at predetermined intervals.

For example, when the two-dimensional code C illustrated in FIG. 2 is input, the creation unit according to the present embodiment may create the tile code TC based on the two-dimensional code C.

The functions of the acquisition unit 120 according to the present embodiment may be implemented by cooperation with a plurality of functional components. For example, the functions of the acquisition unit 120 may be implemented by cooperation with a recognition unit that recognizes a two-dimensional code, an internal state holding unit that holds an internal state during processing, an output unit that outputs the recognized two-dimensional code, and a control unit that controls these components.

The functional configuration of the information processing device 10 according to the present embodiment can be flexibly modified according to specifications and operations.

<<1.3. Details>>

Next, the reading of a tile code by the information processing device 10 according to the present embodiment (acquisition of a two-dimensional code included in the tile code and acquisition of information from the two-dimensional code) will be described in detail.

The reading of a tile code by the information processing device 10 according to the present embodiment is roughly classified into three depending on the size of the imaging range of the imaging unit 110.

First, a case will be described in which the imaging unit 110 has an imaging range Ra sufficiently larger than the size of a two-dimensional code included in the tile code TC. For example, the imaging range Ra may satisfy the condition of $4(S+D)^2 \leq W^2 + H^2$ where S is the length of one side of a two-dimensional code included in the tile code TC, W is the width of the imaging range Ra, and H is the height of the imaging range Ra.

In this example, the ratio (S:D) between the length S of one side of the two-dimensional code included in the tile code TC and the length D of the interval between the two-dimensional codes is known.

Figure 4:
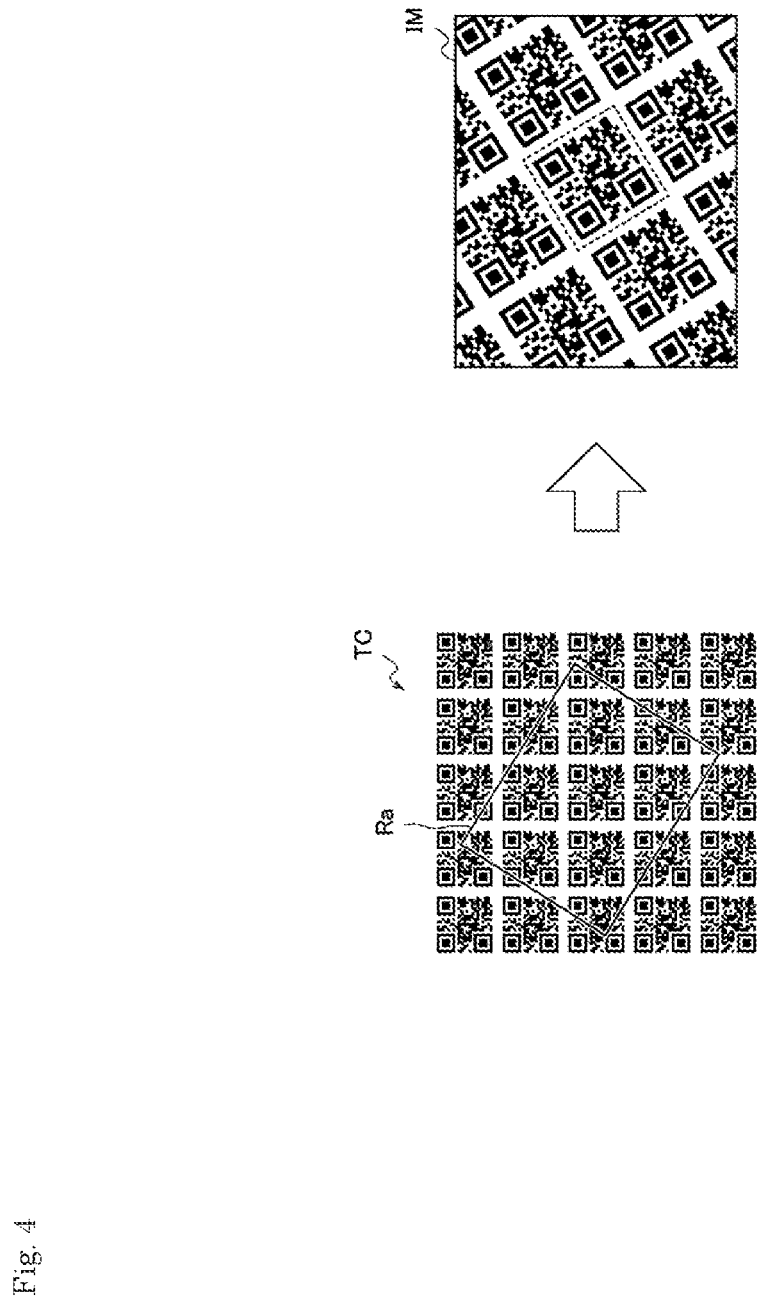
FIG. 4 is a diagram for explaining processing of an acquisition unit 120 in the case where an imaging unit 110 according to the embodiment has an imaging range Ra sufficiently larger than the size of a two-dimensional code included in a tile code TC.

FIG. 4 is a diagram for explaining processing of the acquisition unit 120 for the case where the imaging unit 110 according to the present embodiment has the imaging range Ra sufficiently larger than the size of the two-dimensional code included in the tile code TC.

On the left side of FIG. 4, an example of the imaging range Ra for the tile code TC is illustrated, and on the right side of FIG. 4, an example of an image IM captured by the imaging unit 110 with the imaging range Ra is illustrated.

As illustrated, the image IM captured with the imaging range Ra satisfying the above condition is guaranteed to include at least one two-dimensional code, the information of which is not defective (that is, a code with no missing part, the entire S×S of which is captured).

In this case, the acquisition unit 120 according to the present embodiment first calculates, based on a preset size of each of the two-dimensional codes forming the tile code and a preset length of the interval between the two-dimensional codes, a magnification (scale) R, a position (T, L), and an angle θ of the two-dimensional code in the captured image IM.

More specifically, the acquisition unit 120 may calculate the magnification R, the position (T, L), and the angle θ such that a correlation between the ratio (code:interval) between a code region corresponding to the secondary code and an interval region corresponding to the interval and the above-mentioned (S:D) in the image IM is maximum.

At this time, the acquisition unit 120 may perform the above calculation by detecting the main frequency and angle by, for example, an FFT (Fast Fourier Transform). The acquisition unit 120 may detect the frequency and the angle more limitedly to the correlation in which code:interval is S:D.

Next, the acquisition unit 120 according to the present embodiment acquires, based on the above calculation result, one of the two-dimensional codes, the information of which is not defective, of the plurality of two-dimensional codes included in the captured image IM of the tile code TC, to acquire information from the acquired two-dimensional code.

For example, in the case of the example illustrated in FIG. 4, the acquisition unit 120 may cut out and acquire a two-dimensional code surrounded by a dotted line from three two-dimensional codes, the information of which is not defective, included in the image IM.

At this time, the acquisition unit 120 may perform, for example, estimation of 3D homography or the like to correct the image IM.

According to the above-described processing, the calculation of the frequency, the angle, and the like makes it possible to identify the position of a two-dimensional code, the information of which is not defective, and thus to read it at high speed.

Next, a case will be described in which the imaging unit 110 has an imaging range Rb slightly larger than the size of a two-dimensional code included in the tile code TC. For example, the imaging range Rb may satisfy the conditions of S+D≤W and S+D≤H where S is the length of one side of the two-dimensional code included in the tile code TC, W is the width of the imaging range Rb, and H is the height of the imaging range Rb.

Figure 5:
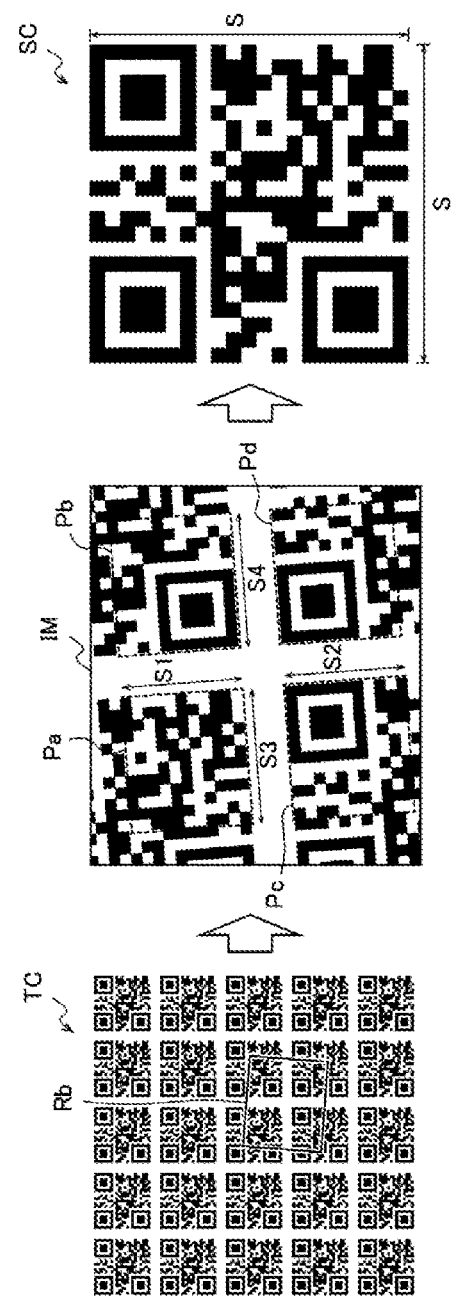
FIG. 5 is a diagram for explaining processing of the acquisition unit 120 for the case where the imaging unit 110 according to the embodiment has an imaging range Rb slightly larger than the size of the two-dimensional code included in the tile code TC.

FIG. 5 is a diagram for explaining processing of the acquisition unit 120 for the case where the imaging unit 110 according to the present embodiment has an imaging range Rb slightly larger than the size of the two-dimensional code included in the tile code TC.

On the left side of FIG. 5, an example of the imaging range Ra for the tile code TC is illustrated.

The image IM captured with the imaging range Rb satisfying the above conditions may include a two-dimensional code, the information of which is not defective, depending on the imaging position, but in many cases, the image IM includes a plurality of two-dimensional codes, the information of which is defective (that is, each code with a missing part, the entire S×S of which fails to be captured), as illustrated in the center of FIG. 5.

Also in this case, as described above, the acquisition unit 120 calculates the magnification (scale) R, the position (T, L), and the angle θ of the two-dimensional code in the image IM.

Next, the acquisition unit 120 according to the present embodiment restores a two-dimensional code, the information of which is not defective, by using the plurality of two-dimensional codes, the information of which is defective, included in the captured single image IM of the tile code TC, and then executes the processing of acquiring information from the restored two-dimensional code.

More specifically, the acquisition unit 120 according to the present embodiment may combine partial code regions extracted from the respective two-dimensional codes, the information of which is defective, included in the image IM, to restore the two-dimensional code, the information of which is not defective.

For example, the acquisition unit 120 according to the present embodiment may extract partial code regions corresponding to the upper left side, the upper right side, the lower left side, and the lower right side from the respective two-dimensional codes, the information of which is defective, included in the image IM. In this case, the acquisition unit 120 can restore the two-dimensional code, the information of which is not defective, by combining the plurality of partial code regions extracted.

For example, in the case of the example illustrated in FIG. 5, the acquisition unit 120 extracts a partial code region Pa corresponding to the lower right side, a partial code region Pb corresponding to the lower left side, a partial code region Pc corresponding to the upper right side, and a partial code region Pd corresponding to the upper left side, from the two-dimensional codes, the information of which is defective, included in the image IM.

At this time, the acquisition unit 120 according to the present embodiment can extract the partial code regions Pa to Pd based on the interval regions corresponding to the intervals between the two-dimensional codes in the tile code.

More specifically, the acquisition unit 120 can detect points where the interval regions intersect in the image IM to identify the partial code regions Pa to Pd from the positional relationship with the points. The positional relationship between the points where the interval regions intersect and the partial code regions Pa to Pd can be obtained from the above-mentioned magnification R, position (T, L), and angle θ.

At this time, the acquisition unit 120 extracts the partial code regions Pa to Pd so as to satisfy the following conditions.

Partial code region $Pa = S1 \times S3$

Partial code region $Pb = S1 \times S4$

Partial code region $Pc = S2 \times S3$

Partial code region $Pd = S2 \times S4$

Here, in addition, the above S1 to S4 satisfy S1+S2≥S and S3+S4≥S.

According to the above processing, even if the image IM includes no two-dimensional code, the information of which is not defective, a two-dimensional code SC, the information of which is not defective, can be restored by combining the partial code regions extracted from the two-dimensional codes, the information of which is defective, and accordingly information can be acquired from the two-dimensional code SC.

Next, a case will be described in which the imaging unit 110 has an imaging range Rc smaller than the size of the two-dimensional code included in the tile code TC. For example, the imaging range Rc may satisfy the condition of S>W or S>H where S is the length of one side of the two-dimensional code included in the tile code TC, W is the width of the imaging range Rc, and H is the height of the imaging range Rc.

Figure 6:
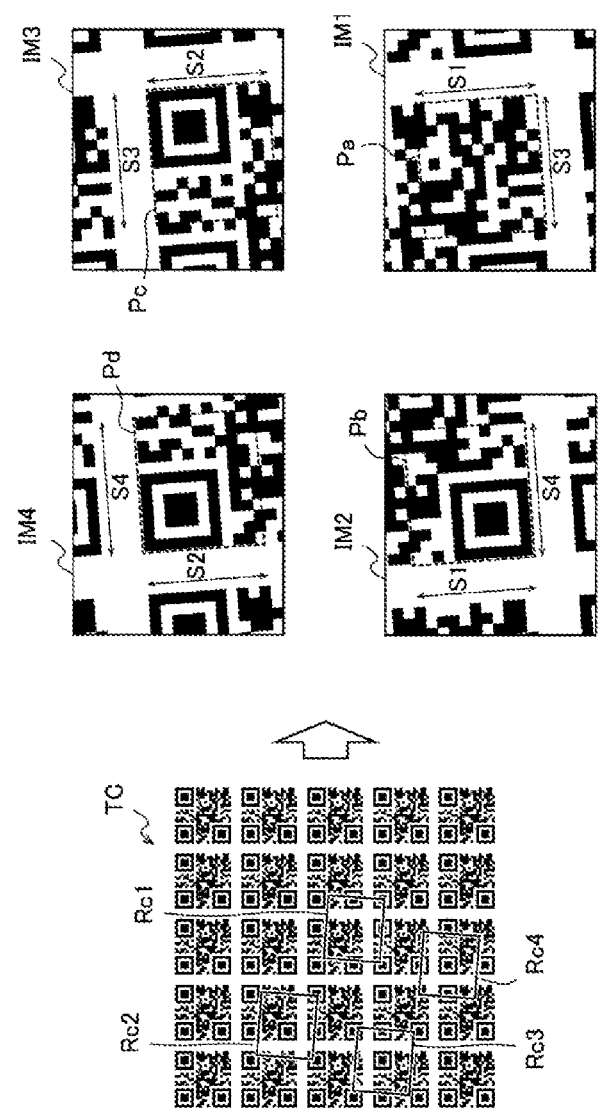
FIG. 6 is a diagram for explaining processing of the acquisition unit 120 for the case where the imaging unit 110 according to the embodiment has an imaging range Rc smaller than the size of the two-dimensional code included in the tile code TC.

FIG. 6 is a diagram for explaining processing of the acquisition unit 120 for the case where the imaging unit 110 according to the present embodiment has the imaging range Rc smaller than the size of the two-dimensional code included in the tile code TC.

On the left side of FIG. 6, imaging ranges Rc1 to Rc4 for the tile code TC are exemplified. As described above, when the imaging unit 110 has such an imaging range Rc smaller than the size of the two-dimensional code included in the tile code TC, the acquisition unit 120 according to the present embodiment may execute the processing based on a plurality of images IM captured by the imaging unit 110.

Specifically, the acquisition unit 120 according to the present embodiment may restore a two-dimensional code, the information of which is not defective, by using the two-dimensional code, the information of which is defective, included in each of the plurality of captured images of the tile code TC.

Also in this case, the acquisition unit 120 first calculates the magnification (scale) R, the position (T, L), and the angle θ of the two-dimensional code in the image IM.

Next, the acquisition unit 120 calculates the width of the interval region based on the above calculation result, and estimates the length S of one side of the two-dimensional code.

Next, the acquisition unit 120 extracts partial code regions P corresponding to the upper left side, the upper right side, the lower left side, and the lower right side from the two-dimensional codes, the information of which is defective, included in the input image IM. At this time, the acquisition unit 120 may perform processing of fitting the extracted partial code region P to a pixel region created based on the estimated length S of one side of the two-dimensional code as described above.

The acquisition unit 120 may repeatedly execute the above-described extraction processing until partial code regions sufficient for restoring the two-dimensional code, the information of which is not defective, are obtained.

For example, in the case of the example illustrated in FIG. 6, the acquisition unit 120 extracts a partial code region Pa (S1×S3) corresponding to the lower right side from a two-dimensional code, the information of which is defective, included in an input image IM1.

Similarly, the acquisition unit 120 extracts a partial code region Pb (S1×S4) corresponding to the lower left side from a two-dimensional code, the information of which is defective, included in an input image IM2.

Similarly, the acquisition unit 120 extracts a partial code region Pc (S2×S3) corresponding to the upper right side from a two-dimensional code, the information of which is defective, included in an input image IM3.

Similarly, the acquisition unit 120 extracts a partial code region Pd (S2×S4) corresponding to the upper left side from a two-dimensional code, the information of which is defective, included in an input image IM4.

Here, when the above S1 to S4 satisfy S1+S2≥S and S3+S4≥S, the acquisition unit 120 determines that the partial code regions sufficient for restoring a two-dimensional code, the information of which is not defective, have been obtained, and combines the partial code regions Pa to Pd, so that the two-dimensional code SC, the information of which is not defective, can be restored.

The reading of the tile code by the information processing device 10 according to the present embodiment has been described in detail above. The extraction of partial code regions and the processing of combining the partial code regions to restore a two-dimensional code, described with reference to FIGS. 5 and 6 are merely examples.

The extraction of partial code regions and the processing of combining the partial code regions to restore a two-dimensional code, according to the present embodiment may be implemented by using another method widely used in the image processing field.

For example, the restoration of a two-dimensional code according to the present embodiment may be implemented by using matching processing based on image features. As such image features, for example, SIFT features may be used.

Further, for example, the restoration of a two-dimensional code according to the present embodiment may be implemented by a machine learning method using a convolutional neural network (CNN) or the like.

As described above, the extraction of partial code regions and the processing of restoring a two-dimensional code, according to the present embodiment can be flexibly modified.

In addition, in the case where a two-dimensional code is restored using partial code regions extracted from the respective images IM as illustrated in FIG. 6, each image IM does not necessarily have to be a captured image of the tile code TC.

The information processing device 10 according to the present embodiment can also restore a two-dimensional code from a plurality of captured images IM of a typical two-dimensional code C. In this case, the acquisition unit 120 according to the present embodiment restores a target code, the information of which is not defective, by using target codes, the information of which is defective, included in the respective captured images, and acquires information from the restored target code.

<<1.4. Flow of Processing>>

Figure 7:
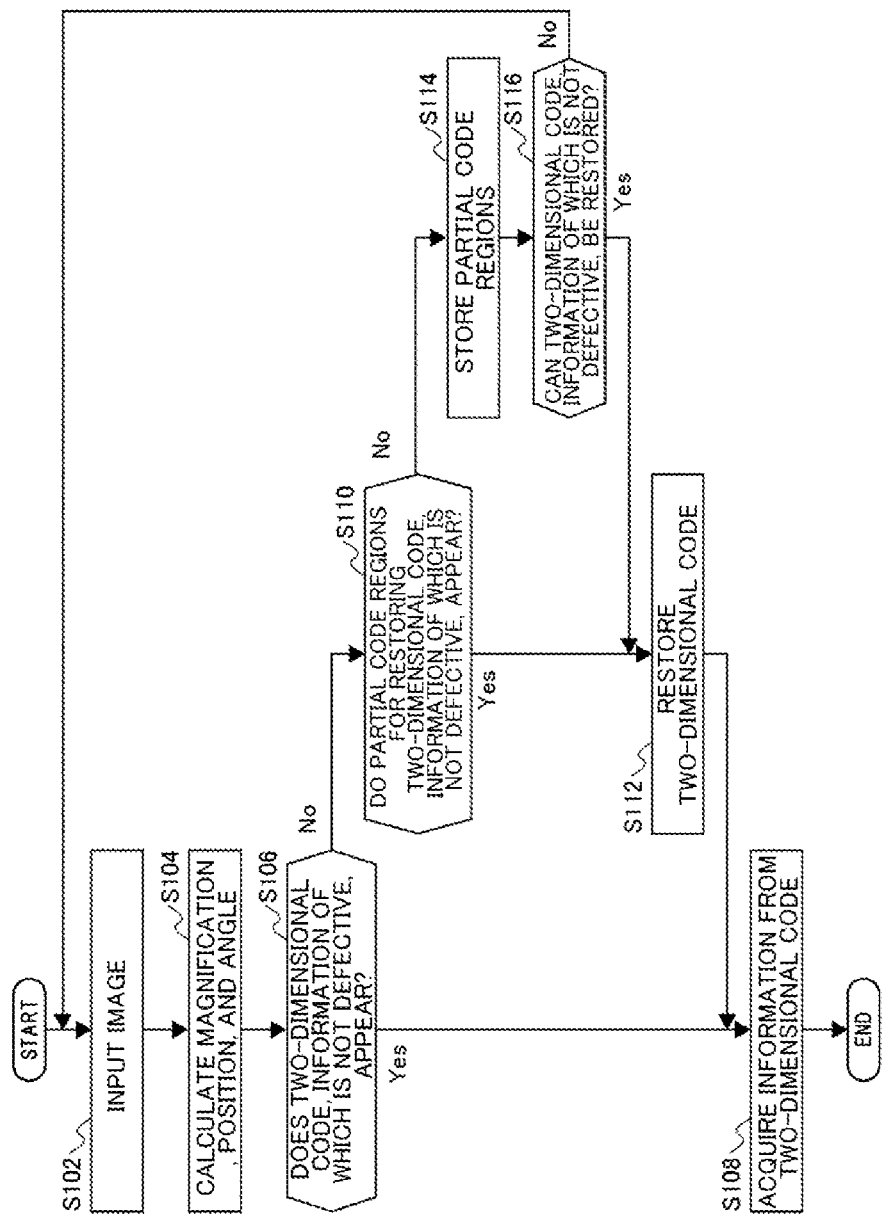
FIG. 7 is a flowchart illustrating an example of a flow of processing performed by the information processing device 10 according to the embodiment.

Next, a flow of processing performed by the information processing device 10 will be described. FIG. 7 is a flowchart illustrating an example of the flow of processing performed by the information processing device 10 according to the present embodiment.

As illustrated in FIG. 7, first, an image of the tile code as being a subject, captured by the imaging unit 110 is input to the acquisition unit 120 (S102).

Next, the acquisition unit 120 calculates the magnification (scale) R, position (T, L), and angle θ of the two-dimensional code included in the captured image in step S102 based on the S:D ratio of the base (S104).

Next, the acquisition unit 120 determines, based on the result of the calculation in step S104, whether or not a two-dimensional code, the information of which is not defective, appears in the captured image in S102 (S106).

When the acquisition unit 120 determines that a two-dimensional code, the information of which is not defective, appears in the captured image in S102 (S106: Yes), the acquisition unit 120 acquires the two-dimensional code, the information of which is not defective, included in the image, to acquire information from the two-dimensional code (S108).

On the other hand, when the acquisition unit 120 determines that a two-dimensional code, the information of which is not defective, does not appear in the captured image in S102 (S106: No), then the acquisition unit 120 determines whether or not partial code regions sufficient for restoring the two-dimensional code, the information of which is not defective, appear in that image (S110).

When the acquisition unit 120 determines that partial code regions sufficient for restoring the two-dimensional code, the information of which is not defective, appear in the captured image in S102 (S110: Yes), the acquisition unit 120 restores, by using a plurality of partial code regions extracted from that image, the two-dimensional code, the information of which is not defective (S112). Further, the acquisition unit 120 acquires information from the two-dimensional code restored in step S112 (S108).

On the other hand, the acquisition unit 120 determines that partial code regions sufficient for restoring the two-dimensional code, the information of which is not defective, appear in the captured image in S102 (S110: No), the acquisition unit 120 extracts the partial code regions from that image, and stores the partial code regions (S114).

Next, the acquisition unit 120 determines whether or not the two-dimensional code, the information of which is not defective, can be restored by using the stored partial code regions (S116).

When the acquisition unit 120 determines that the two-dimensional code, the information of which is not defective, can be restored by using the stored partial code regions (S116: Yes), the acquisition unit 120 restores, by using the stored partial code regions, the two-dimensional code, the information of which is not defective (S112). Further, the acquisition unit 120 acquires information from the two-dimensional code restored in step S112 (S108).

On the other hand, when the acquisition unit 120 determines that the two-dimensional code, the information of which is not defective, cannot be restored by using the stored partial code regions, the acquisition unit 120 returns to step S102 and repeatedly executes the subsequent processing.

<<1.5. Application Examples>>

The examples of the basic operation regarding the reading of the tile code by the information processing device 10 according to the present embodiment have been described above.

In the above description, the cases where the information processing device 10 according to the present embodiment is a watch-type wearable device have been described as main examples. On the other hand, the aspect of the information processing device 10 according to the present embodiment is not limited to the above examples, and can be implemented as various devices.

For example, in recent years, the number of scenes in which two-dimensional codes are used in transportation is increasing. For example, some airlines and railway companies provide services such as providing a user with a paper ticket printed with a two-dimensional code and sending an image of a two-dimensional code to a smartphone owned by a user or the like.

In this case, when the user causes a reading device installed at an airport or a station to read the two-dimensional code printed on a paper ticket or the two-dimensional code displayed on a smartphone or the like, the user can enter the facility or check in.

However, in many cases, such a reading device does not present a captured image to the user. Accordingly, it is difficult for the user to understand whether the reading device is reading the two-dimensional code correctly and how to adjust the position so that the reading device can read the two-dimensional code correctly.

For such reasons, the information processing device 10 according to the present embodiment may be applied to such a reading device for two-dimensional codes in transportation.

For example, the information processing device 10 according to the present embodiment may be fixedly installed, and the imaging unit 110 may capture the tile code present on a medium which the user brings close to the imaging unit 110.

Figure 8:
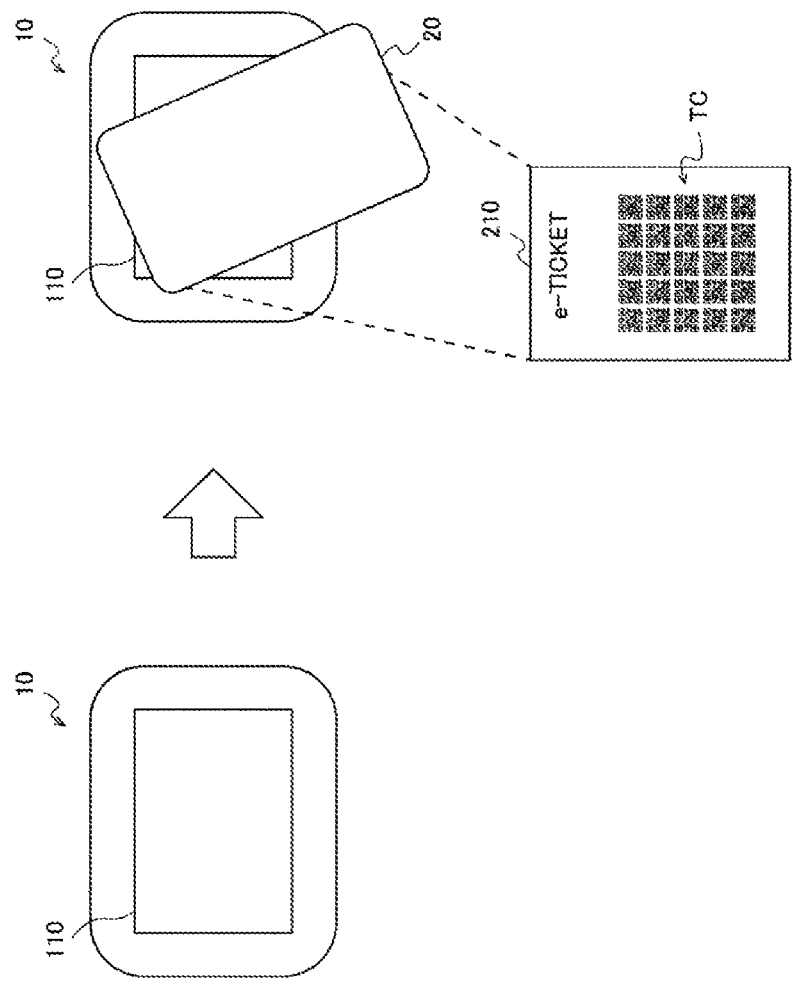
FIG. 8 is a diagram for explaining an example in which the information processing device 10 according to the embodiment is applied to a two-dimensional code reading device for transportation.

FIG. 8 is a diagram for explaining an example in which the information processing device 10 according to the present embodiment is applied to a two-dimensional code reading device for transportation.

On the left side of FIG. 8, the outer shape of the information processing device 10 applied to a two-dimensional code reading device for transportation is illustrated. As illustrated in FIG. 8, in the information processing device 10, the imaging unit 110 for capturing an image of the tile code is disposed, for example, on the upper surface of the device.

In this case, the user causes the information processing device 10 to capture an image of the tile code on a medium, for example, by holding the medium close to the imaging unit 110. The medium may be a paper medium or an electronic medium such as a smartphone.

For example, in the case of the example illustrated on the right side of FIG. 8, the user brings a smartphone 20 close to the imaging unit 110 so that the tile code TC displayed on a display unit 210 included in the smartphone 20 faces the imaging unit 110.

The smartphone 20 is an example of an information processing device including a display unit that displays a tile code in which a plurality of identical target codes are arranged at predetermined intervals.

According to the information processing device 10 and the smartphone 20 as described above, even when the user causes a fixed device (imaging unit) to read a two-dimensional code, it is possible to reduce the load of alignment and to effectively improve the reading accuracy.

As described above, the information processing device 10 according to the present embodiment can be provided as various types of devices.

The cases where the target code included in the tile code according to the present embodiment is a two-dimensional code have been described above as main examples. On the other hand, the type of the target code included in the tile code according to the present embodiment is not limited to the above examples.

Figure 9:
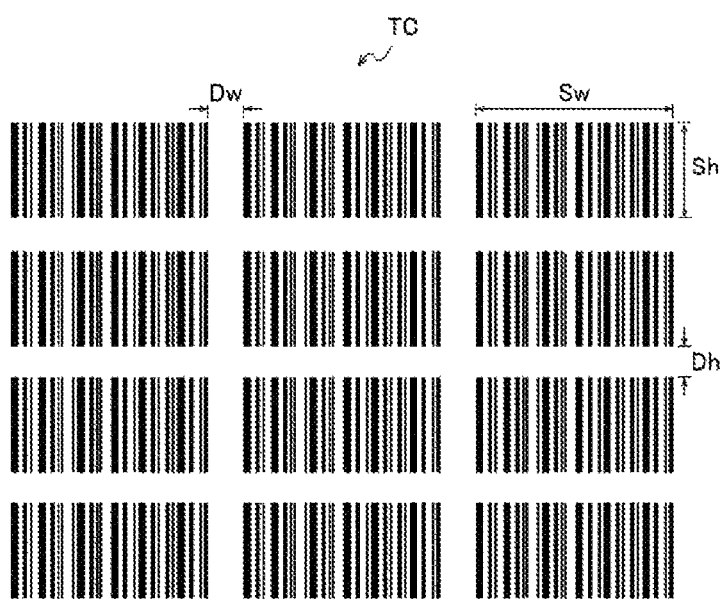
FIG. 9 is a diagram illustrating an example of a tile code for the case where the target code according to the embodiment is a one-dimensional code.

The target code included in the tile code according to the present embodiment may be a one-dimensional code. FIG. 9 is a diagram illustrating an example of the tile code for the case where the target code according to the present embodiment is a one-dimensional code.

Even in this case, a plurality of one-dimensional codes with the same shape and same size are arranged in the tile code TC at predetermined intervals.

For example, in the case of the example illustrated in FIG. 9, the one-dimensional codes included in the tile code TC each have a width Sw and a height Sh, and are arranged at intervals Dw on the X axis and at intervals Dh on the Y axis.

The target code according to the present embodiment may be a pattern in which the width, height, and arrangement interval are determined to predetermined values as described above. The tile code according to the present embodiment can be applied to various target patterns.

<2. Hardware Configuration Example>

Figure 10:
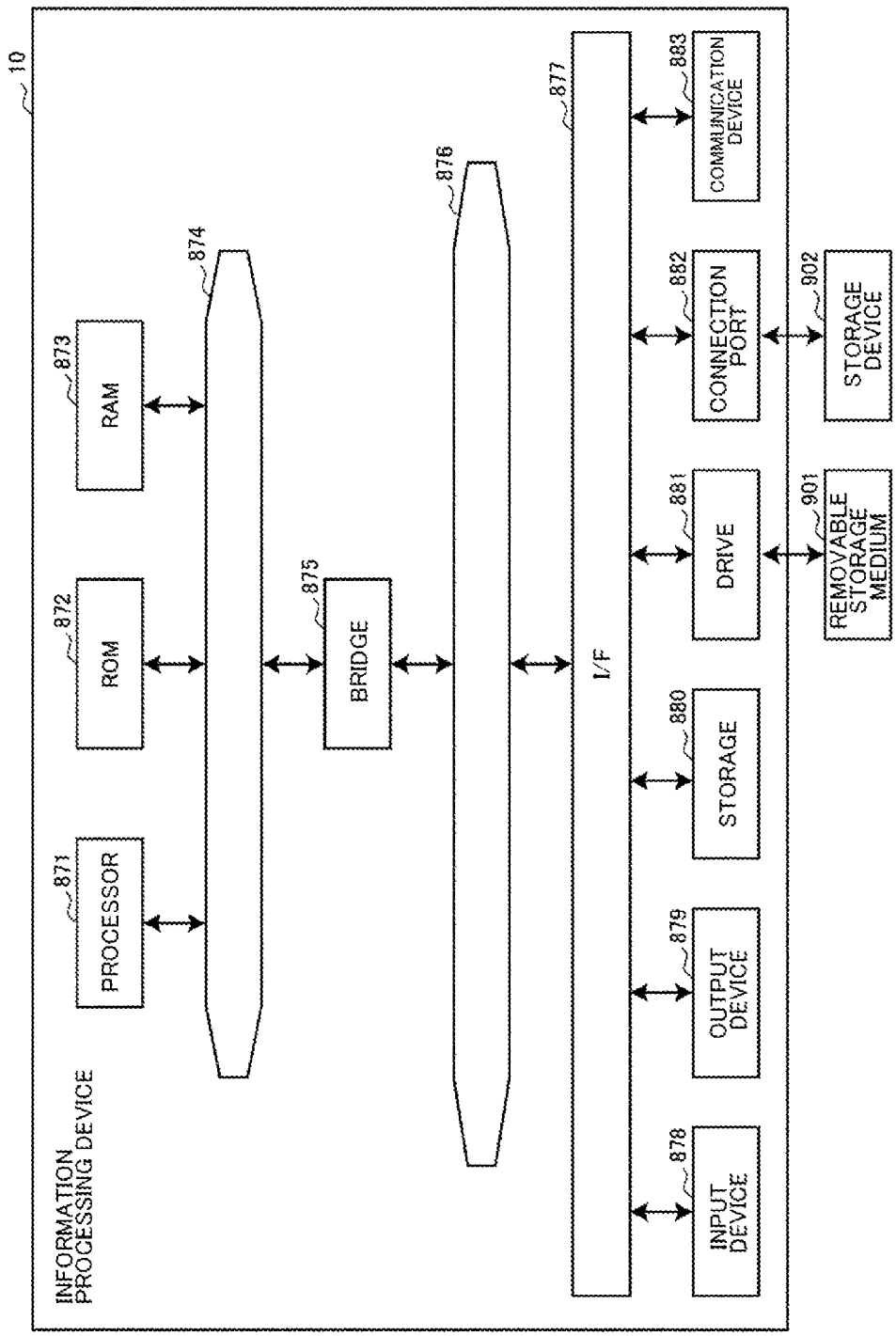
FIG. 10 is a block diagram illustrating a hardware configuration example of the information processing device 10 according to the embodiment.

Next, a hardware configuration example of the information processing device 10 according to an embodiment of the present disclosure will be described. FIG. 10 is a block diagram illustrating a hardware configuration example of the information processing device 10 according to the embodiment of the present disclosure. As described in FIG. 10, the information processing device 10 includes a processor 871, a ROM 872, a RAM 873, a host bus 874, a bridge 875, an external bus 876, an interface 877, an input device 878, an output device 879, a storage 880, a drive 881, a connection port 882, and a communication device 883, for example. The hardware configuration illustrated herein is an example, and some of the components may be omitted. Further, components other than the components illustrated herein may be further included.

(Processor 871)

The processor 871 functions as, for example, an arithmetic processing device or a control device, and controls all or some of the operations of the components on the basis of various programs recorded in the ROM 872, the RAM 873, the storage 880, or a removable recording medium 901.

(ROM 872, RAM 873)

The ROM 872 is a means for storing a program read into the processor 871, data used for calculation, and the like. In the RAM 873, for example, a program read into the processor 871, various parameters that change as appropriate when the program is executed, and the like are temporarily or permanently stored.

(Host Bus 874, Bridge 875, External Bus 876, Interface 877)

The processor 871, the ROM 872, and the RAM 873 are connected to each other via, for example, a host bus 874 capable of high-speed data transmission. On the other hand, the host bus 874 is connected to the external bus 876, which provides a relatively low data transmission speed, via, for example, the bridge 875. The external bus 876 is connected to various components via the interface 877.

(Input Device 878)

For the input device 878, for example, a mouse, a keyboard, a touch panel, buttons, switches, levers, and the like are used. As the input device 878, a remote controller capable of transmitting a control signal using infrared rays or other radio waves may be used. The input device 878 also includes a voice input device such as a microphone.

(Output Device 879)

The output device 879 is, for example, a device capable of notifying users of acquired information visually or audibly, such as a display device such as a CRT (Cathode Ray Tube), an LCD, or an organic EL, an audio output device such as a speaker or a headphone, a printer, a mobile phone, a facsimile, or the like. The output device 879 according to the present disclosure also includes various vibration devices capable of outputting tactile stimuli.

(Storage 880)

The storage 880 is a device for storing various types of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Naturally, the removable recording medium 901 may be, for example, an IC card equipped with a non-contact type IC chip, an electronic device, or the like.

(Connection Port 882)

The connection port 882 is a port for connecting an external connection device 902 such as a USB (Universal Serial Bus) port, an IEEE1394 port, a SCSI (Small Computer System Interface), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or WUSB (Wireless USB), a router for optical communication, a router for ADSL (Asymmetric Digital Subscriber Line), or a modem for various communications.

<3. Conclusion>

As described above, the information processing device 10 according to an embodiment of the present disclosure includes an acquisition unit 120 that acquires a target code from a captured image to acquire information from the target code. The acquisition unit 120 according to an embodiment of the present disclosure has a feature of acquiring a target code from a captured image of a tile code in which a plurality of identical target codes are arranged at predetermined intervals.

According to the above configuration, it is possible to realize more efficient reading of the target code.

Although the preferred embodiments of the present disclosure have been described in detail with reference to the accompanying figures as described above, the technical scope of the present disclosure is not limited to such examples. It is apparent that those having ordinary knowledge in the technical field of the present disclosure could conceive various modified examples or changed examples within the scope of the technical ideas set forth in the claims, and it should be understood that these also naturally fall within the technical scope of the present disclosure.

For example, in the above-described embodiments, the cases where the imaging unit 110 is arranged apart from a display unit such as a display are exemplified with reference to FIG. 1 and FIG. 8. However, the arrangement of the imaging unit 110 is not limited to such examples. For example, the imaging unit 110 may be arranged below a display unit such as a display or a touch panel, so that it can capture the target code through the display unit. In this case, the imaging unit 110 can capture the fingerprint from the user's finger in contact with the display unit in addition to the target code.

The steps related to the processing described in the present specification do not necessarily have to be processed in chronological order in the order described in the flowchart or the sequence diagram. For example, the steps related to the processing of each device may be processed in an order different from the order described, or may be processed in parallel.

The series of processing performed by each device described herein may be realized by using any software, hardware, and a combination of software and hardware. Programs as software are stored in advance in, for example, a recording medium (non-transitory media) provided inside or outside each device. Then, each program, when executed by a computer, is read into a RAM and executed by various types of processors, for example. The recording medium is, for example, a magnetic disk, an optical disc, a magneto-optical disk, or a flash memory. Further, the above computer program may be distributed via, for example, a network without using the recording medium.

Further, the effects described in the present specification are merely explanatory or exemplary and are not intended as limiting. The technologies according to the present disclosure may exhibit other effects apparent to those skilled in the art from the description herein, in addition to or in place of the above effects.

Further, the following configurations also fall within the technical scope of the present disclosure.

(1) An information processing device including an acquisition unit that acquires a target code from a captured image to acquire information from the target code, wherein the acquisition unit acquires a target code from a captured image of a tile code in which a plurality of identical target codes are arranged at predetermined intervals.

(2) The information processing device according to (1), wherein the tile code is a code in which at least two or more target codes with the same shape and same size are arranged at predetermined intervals in each of a first direction and a second direction orthogonal to the first direction.

(3) The information processing device according to (1) or (2), wherein the acquisition unit acquires one of the target codes, information of which is not defective, of the plurality of target codes included in the captured image of the tile code, to acquire information from the acquired target code.

(4) The information processing device according to (1) or (2), wherein the acquisition unit restores a target code, information of which is not defective, by using a plurality of target codes, information of which is defective, included in the captured image of the tile code, and acquires information from the restored target code.

(5) The information processing device according to (4), wherein the acquisition unit restores a target code, information of which is not defective, by using a plurality of target codes, information of which is defective, included in a captured single image of the tile code.

(6) The information processing device according to (4), wherein the acquisition unit restores a target code, information of which is not defective, by using target codes, information of which is defective, included in respective captured images of the tile code.

(7) The information processing device according to any one of (4) to (6), wherein the acquisition unit combines partial code regions extracted from the respective target codes, information of which is defective, to restore the target code, information of which is not defective.

(8) The information processing device according to (7), wherein the acquisition unit extracts the partial code regions corresponding to upper left side, upper right side, lower left side, and lower right side from the respective target codes, information of which is defective, and combines the extracted partial code regions to restore the target code, information of which is not defective.

(9) The information processing device according to (8), wherein the acquisition unit extracts the partial code regions based on interval regions corresponding to intervals between the target codes in the tile code.

(10) The information processing device according to any one of (1) to (9), wherein the acquisition unit calculates, based on a preset size of each of the target codes forming the tile code and a preset length of an interval between the target codes, a magnification, a position, and an angle of the target code in the captured image.

(11) The information processing device according to any one of (1) to (10), further including an imaging unit that captures the tile code.

(12) The information processing device according to (11), wherein the imaging unit does macro photography to capture the tile code.

(13) The information processing device according to (11) or (12), wherein the information processing device is a watch-type wearable device, and the imaging unit continuously captures the tile code based on a user operation.

(14) The information processing device according to (11) or (12), wherein the information processing device is fixedly installed, and the imaging unit captures the tile code present on a medium which a user brings close to the imaging unit.

(15) The information processing device according to any one of (1) to (14), wherein the captured image of the tile code is not presented to a user.

(16) The information processing device according to any one of (1) to (15), wherein the target code includes a two-dimensional code.

(17) The information processing device according to (16), wherein the two-dimensional code includes a QR code.

(18) An information processing method including acquiring, by a processor, a target code from a captured image to acquire information from the target code, wherein the acquiring further includes acquiring a target code from a captured image of a tile code in which a plurality of identical target codes are arranged at predetermined intervals.

(19) A program causing a computer to function as an information processing device including an acquisition unit that acquires a target code from a captured image to acquire information from the target code, wherein the acquisition unit acquires a target code from a captured image of a tile code in which a plurality of identical target codes are arranged at predetermined intervals.

(20) An information processing device including an acquisition unit that acquires a target code from a captured image to acquire information from the target code, wherein the acquisition unit restores a target code, information of which is not defective, by using target codes, information of which is defective, included in respective captured images, and acquires information from the restored target code.

(21) An information processing method including creating, by a processor, based on an input target code, a tile code in which a plurality of target codes with the same shape as the input target code are arranged at predetermined intervals.

(22) An information processing device including a display unit that displays a tile code in which a plurality of identical target codes are arranged at predetermined intervals.

REFERENCE SIGNS LIST

10 Information processing device
110 Imaging unit
120 Acquisition unit
20 Smartphone
210 Display unit
TC Tile code
C Target code
P Partial code region

The invention claimed is:

1. An information processing device comprising:
an acquisition unit configured to acquire a target code from a captured image to acquire information from the target code,
wherein the acquisition unit acquires the target code from the captured image including a tile code in which a plurality of identical target codes are arranged at predetermined intervals, wherein the acquisition unit acquires the target code by using partial code regions of the plurality of target codes included in the captured image upon a determination that the partial code regions are sufficient to restore the target code, and wherein the acquisition unit is implemented via at least one processor.

2. The information processing device according to claim 1, wherein the tile code is a code in which at least two or more target codes with the same shape and same size are arranged at predetermined intervals in each of a first direction and a second direction orthogonal to the first direction.

3. The information processing device according to claim 1, wherein the acquisition unit acquires one of the target codes, information of which is not defective, of the plurality of target codes included in the captured image of the tile code, to acquire information from the acquired target code.

4. The information processing device according to claim 1, wherein the acquisition unit restores the target code, information of which is not defective, by using each of the plurality of target codes, information of which is defective, included in the captured image of the tile code in order to acquire the information from the restored target code.

5. The information processing device according to claim 4, wherein the acquisition unit restores the target code, information of which is not defective, by using the plurality of target codes, information of which is defective, included in a captured single image of the tile code.

6. The information processing device according to claim 4, wherein the acquisition unit restores the target code, information of which is not defective, by using respective target codes, information of which is defective, included in respective captured images of the tile code.

7. The information processing device according to claim 4, wherein the acquisition unit combines the partial code regions extracted from the respective target codes, information of which is defective, to restore the target code, information of which is not defective.

8. The information processing device according to claim 7, wherein the acquisition unit extracts the partial code regions corresponding to upper left side, upper right side, lower left side, and lower right side from the respective target codes, information of which is defective, and combines the extracted partial code regions to restore the target code, information of which is not defective.

9. The information processing device according to claim 8, wherein the acquisition unit extracts the partial code regions based on interval regions corresponding to intervals between the target codes in the tile code.

10. The information processing device according to claim 1, wherein the acquisition unit calculates, based on a preset size of each of the target codes forming the tile code and a preset length of an interval between the target codes, a magnification, a position, and an angle of the target code in the captured image.

11. The information processing device according to claim 1, further comprising an imaging unit that captures the tile code.

12. The information processing device according to claim 11, wherein the imaging unit does macro photography to capture the tile code.

13. The information processing device according to claim 11, wherein
the information processing device is a watch-type wearable device, and
the imaging unit continuously captures the tile code based on a user operation.

14. The information processing device according to claim 11, wherein
the information processing device is fixedly installed, and
the imaging unit captures the tile code present on a medium which a user brings close to the imaging unit.

15. The information processing device according to claim 1, wherein the captured image of the tile code is not presented to a user.

16. The information processing device according to claim 1, wherein the target code includes a two-dimensional code.

17. The information processing device according to claim 16, wherein the two-dimensional code includes a QR code.

18. An information processing method comprising:
acquiring, by a processor, a target code from a captured image to acquire information from the target code,
wherein the acquiring further includes acquiring the target code from the captured image including a tile code in which a plurality of identical target codes are arranged at predetermined intervals, and
wherein the target code is acquired by using partial code regions of the plurality of target codes included in the captured image upon a determination that the partial code regions are sufficient to restore the target code.

19. A non-transitory computer-readable storage medium having embodied thereon a program, which when executed by a computer causes the computer to execute a method, the method comprising:
acquiring a target code from a captured image to acquire information from the target code,
wherein the target code is acquired from the captured image including a tile code in which a plurality of identical target codes are arranged at predetermined intervals, and
wherein the target code is acquired by using partial code regions of the plurality of target codes included in the captured image upon a determination that the partial code regions are sufficient to restore the target code.

* * * * *